(12) United States Patent
Shen et al.

(10) Patent No.: US 10,720,680 B2
(45) Date of Patent: Jul. 21, 2020

(54) TRAY ASSEMBLY FOR AUTOMOBILE USE, BATTERY PACK BODY FOR AUTOMOBILE USE AND AUTOMOBILE

(71) Applicant: BYD COMPANY LIMITED, Shenzhen, Guangdong (CN)

(72) Inventors: Xi Shen, Shenzhen (CN); Zhipei Lu, Shenzhen (CN); Jia Lu, Shenzhen (CN); Weixin Zheng, Shenzhen (CN); Yan Zhu, Shenzhen (CN); Jianhua Zhu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/329,174

(22) PCT Filed: Aug. 14, 2017

(86) PCT No.: PCT/CN2017/097402
§ 371 (c)(1),
(2) Date: Feb. 27, 2019

(87) PCT Pub. No.: WO2018/040901
PCT Pub. Date: Mar. 8, 2018

(65) Prior Publication Data
US 2019/0190096 A1    Jun. 20, 2019

(30) Foreign Application Priority Data
Aug. 31, 2016    (CN) ..................... 2016 2 1011857 U

(51) Int. Cl.
*H01M 2/10*    (2006.01)
*H01M 10/625*    (2014.01)
(Continued)

(52) U.S. Cl.
CPC ............. *H01M 10/625* (2015.04); *B60K 1/04* (2013.01); *B62D 25/20* (2013.01); *H01M 2/10* (2013.01);
(Continued)

(58) Field of Classification Search
CPC ........... H01M 10/625; H01M 10/6552; H01M 10/613; H01M 2/10; H01M 2/1077;
(Continued)

(56) References Cited

U.S. PATENT DOCUMENTS 8,403,090 B2    3/2013    Fujiwara et al.
9,281,505 B2    3/2016    Hihara et al.
(Continued)

FOREIGN PATENT DOCUMENTS

CN    102163702 A    8/2011
CN    103633263 A    3/2014
(Continued)

OTHER PUBLICATIONS

PCT International Search Report and the Written Opinion dated Nov. 3, 2017, issued in related International Application No. PCT/CN2017/097402 (13 pages).
(Continued)

*Primary Examiner* — Erez Gurari

(57) ABSTRACT

The present disclosure provides an automobile tray component, including a tray base plate and mounting beams arranged around the tray base plate, where the tray base plate includes an upper plate body, an intermediate plate body, and a lower plate body, a cooling cavity is arranged between the upper plate body and the intermediate plate body, and a buffer cavity is arranged between the intermediate plate body and the lower plate body.

9 Claims, 4 Drawing Sheets

(51) Int. Cl.
  *B60K 1/04* (2019.01)
  *B62D 25/20* (2006.01)
  *H01M 10/613* (2014.01)
  *H01M 10/6552* (2014.01)
  *B60K 1/00* (2006.01)

(52) U.S. Cl.
  CPC ....... *H01M 2/1077* (2013.01); *H01M 10/613* (2015.04); *H01M 10/6552* (2015.04); *B60K 2001/005* (2013.01); *B60Y 2306/05* (2013.01); *H01M 2220/20* (2013.01)

(58) Field of Classification Search
  CPC ..... H01M 2220/20; B62D 25/20; B60K 1/04; B60K 2001/005
  See application file for complete search history.

(56) References Cited

U.S. PATENT DOCUMENTS

| | | | |
|---|---|---|---|
| 9,306,246 B2 | 4/2016 | Rawlinson | |
| 9,306,247 B2 | 4/2016 | Rawlinson | |
| 9,440,523 B2 | 9/2016 | Decker | |
| 9,735,404 B2 | 8/2017 | Ohgitani et al. | |
| 2011/0206948 A1 | 8/2011 | Asai et al. | |
| 2015/0171485 A1 | 6/2015 | Rawlinson | |
| 2015/0249240 A1* | 9/2015 | Hihara | B60K 1/04 180/68.5 |
| 2015/0255764 A1* | 9/2015 | Loo | H01M 2/1083 429/149 |
| 2016/0288636 A1* | 10/2016 | Kamimura | B62D 25/2036 |
| 2016/0375750 A1* | 12/2016 | Hokazono | B60K 1/04 180/68.5 |
| 2017/0012330 A1* | 1/2017 | Kim | H01M 2/1077 |
| 2017/0018745 A1* | 1/2017 | Nakamori | H01M 2/043 |
| 2017/0025721 A1* | 1/2017 | Moschet | H01M 10/625 |
| 2018/0251102 A1* | 9/2018 | Han | B60S 5/06 |
| 2019/0058172 A1* | 2/2019 | Syed | H01M 10/655 |
| 2019/0334136 A1* | 10/2019 | Eftekhari | H01M 10/6554 |

FOREIGN PATENT DOCUMENTS

| | | |
|---|---|---|
| CN | 204361209 A | 5/2015 |
| CN | 205282525 U | 6/2016 |
| CN | 106025132 A | 10/2016 |
| CN | 205863246 U | 1/2017 |
| CN | 206201948 U | 5/2017 |
| DE | 102015206522 A1 | 10/2016 |
| JP | 11-178115 A | 1/2001 |
| JP | 2003-108145 A | 4/2003 |
| JP | 2009-105007 A | 5/2009 |
| JP | 2012-256468 A | 12/2012 |
| JP | 2014-139895 A | 7/2014 |
| JP | 2015-119626 A | 6/2015 |
| JP | 2015-224027 A | 12/2015 |
| WO | 2014/061109 A1 | 9/2016 |

OTHER PUBLICATIONS

Office Action for Japanese Application No. 2019-510888, dated Feb. 25, 2020.

* cited by examiner

TRAY ASSEMBLY FOR AUTOMOBILE USE, BATTERY PACK BODY FOR AUTOMOBILE USE AND AUTOMOBILE

CROSS-REFERENCE TO RELATED APPLICATIONS

This application is a national phase application of International Application No. PCT/CN2017/097402, filed on Aug. 14, 2017, which is based on and claims priority to and benefits of Chinese Patent Application No. 201621011857.4, filed with the State Intellectual Property Office (SIPO) of the People's Republic China on Aug. 31, 2016. The entire contents of the above-identified applications are incorporated herein by reference.

TECHNICAL FIELD

The present disclosure relates to the field of automobile parts, and in particular, to an automobile tray component, an automobile battery package, and an automobile.

BACKGROUND

With the increasing development of new energy automobiles, requirements for mounting and safety performance of power batteries in the new energy automobiles become increasingly high. In particular, how to install the power battery in a vehicle, while at the same time taking into account the safety of the power battery during use and its ability to cope with some special problems, is a difficult obstacle to the development of new energy vehicles.

In the new energy automobiles, a common practice employed currently is mounting power batteries (module sets or modules) on an automobile tray. This not only saves space, but also can centralize the weight of the power batteries at the bottom of an automobile, so as to improve the stability of the automobile. Meanwhile, with the feature that the bottom of the tray is exposed, the bottom of the tray can be cooled by natural wind during travelling of the automobile, thus achieving the cooling of the power batteries arranged on the tray.

In the prior art, as shown in FIG. 1, a conventional steel tray is used; the conventional steel tray includes mounting beams 20 and a tray base plate 10, mounting structures are arranged on the tray base plate 10, and power batteries are mounted on the tray base plate 10 via the mounting structures; and mounting portions 60 are arranged on the mounting beams 20, and the steel tray is fixed on the automobile via the mounting portions 60. During use of the automobile, since the tray base plate 10 is usually arranged at the very bottom of the automobile, that is, in a position similar to that of an automobile chassis, an impact may occur to the automobile inevitably during travelling. In addition, the conventional steel tray is a structure of a single layer with no buffer function in crash, thereby easily resulting in battery damage, battery thermal runaway, and even fire, threatening the safety of a passenger. Additionally, the conventional steel tray has insufficient strength and rigidness, and thus cannot meet a requirement for being capable of resisting long time vibration when being mounted on the automobile. Also, the steel tray is relatively heavy, which is disadvantageous for a requirement for light weight of the new energy automobile. Moreover, with the limit of material and strength of the steel tray itself, during manufacturing the steel tray, an edge of the steel tray needs to be provided with a bevel. This not only occupies a large space, but also is adverse to the placement of the power batteries in the interior.

Additionally, the steel tray has poor performance of heat dissipation. Heat dissipation components of a battery module set are all integrated and mounted in a cavity formed by the steel tray and a steel tray cover. This not only occupies large space, but also has poor performance of heat dissipation.

SUMMARY

The present disclosure is intended to solve at least one technical problems mentioned above to some extent, and provides an automobile tray component, an automobile battery package, and an automobile, with good performance of heat dissipation, capability of providing a buffer effect in crash, little space occupation and high safety performance.

To this end, the present disclosure provides an automobile tray component, including a tray base plate and mounting beams arranged around the tray base plate, where the tray base plate includes an upper plate body, an intermediate plate body, and a lower plate body, a cooling cavity is arranged between the upper plate body and the intermediate plate body, and a buffer cavity is arranged between the intermediate plate body and the lower plate body.

According to the automobile tray component of embodiments of the present disclosure, the tray base plate includes the upper plate body, the intermediate plate body, and the lower plate body, and the buffer cavity is arranged between the intermediate plate body and the lower plate body, so that when an impact occurs to an automobile during travelling, the buffer cavity can provide a good effect of buffer so as to reduce influence of the impact on a power battery and improve safety of use of the power battery. Meanwhile, a phase change material, a thermal insulation material, or other parts may also be arranged in the buffer cavity, so as to save the space to some extent while improving the safety performance. Additionally, the cooling cavity is arranged between the upper plate body and the intermediate plate body, and a cooling medium or a cooling pipe may be mounted in the cooling cavity, so that good effects of heat dissipation and temperature reduction can be achieved.

According to some embodiments of the present disclosure, the tray base plate includes at least one sub-base plate, the sub-base plate includes an upper sub-plate body, an intermediate sub-plate body, and a lower sub-plate body, a cooling cavity is arranged between the upper sub-plate body and the intermediate sub-plate body, and a buffer cavity is arranged between the intermediate sub-plate body and the lower sub-plate body.

According to some embodiments of the present disclosure, a cooling pipe is arranged in the cooling cavity.

According to some embodiments of the present disclosure, the sub-base plate is a one-piece extruded aluminium base plate.

Preferably, the tray base plate is constituted by combining at least two sub-base plates, and two adjacent sub-base plates are connected by means of welding.

According to some embodiments of the present disclosure, the cooling cavity and/or the buffer cavity extend(s) in a width direction of the automobile tray component.

According to some embodiments of the present disclosure, a battery mounting structure for mounting a power battery is arranged on the tray base plate.

According to some embodiments of the present disclosure, the buffer cavity is a vacuum cavity, or the buffer cavity is filled with an energy absorption material, or the buffer cavity is filled with a thermal insulation material.

The present disclosure further provides an automobile battery package, including a tray component, an encapsulation cover, and several power batteries arranged in a mounting space formed by the encapsulation cover and the tray component, where the tray component is the automobile tray component provided in the present disclosure.

The present disclosure further provides an automobile, including an automobile tray component and a power battery arranged on the automobile tray component, wherein the automobile tray component is the automobile tray component provided in the present disclosure.

Additional aspects and advantages of the present disclosure will be given in part in the following description, and will become apparent in part from the following description or learned by practice of the present disclosure.

BRIEF DESCRIPTION OF THE DRAWINGS

The above and/or additional aspects and advantages of the present disclosure will become apparent and be easily understood from the following description of the embodiments in combination with the accompanying drawings, where.

REFERENCE NUMERALS

Figure 1:
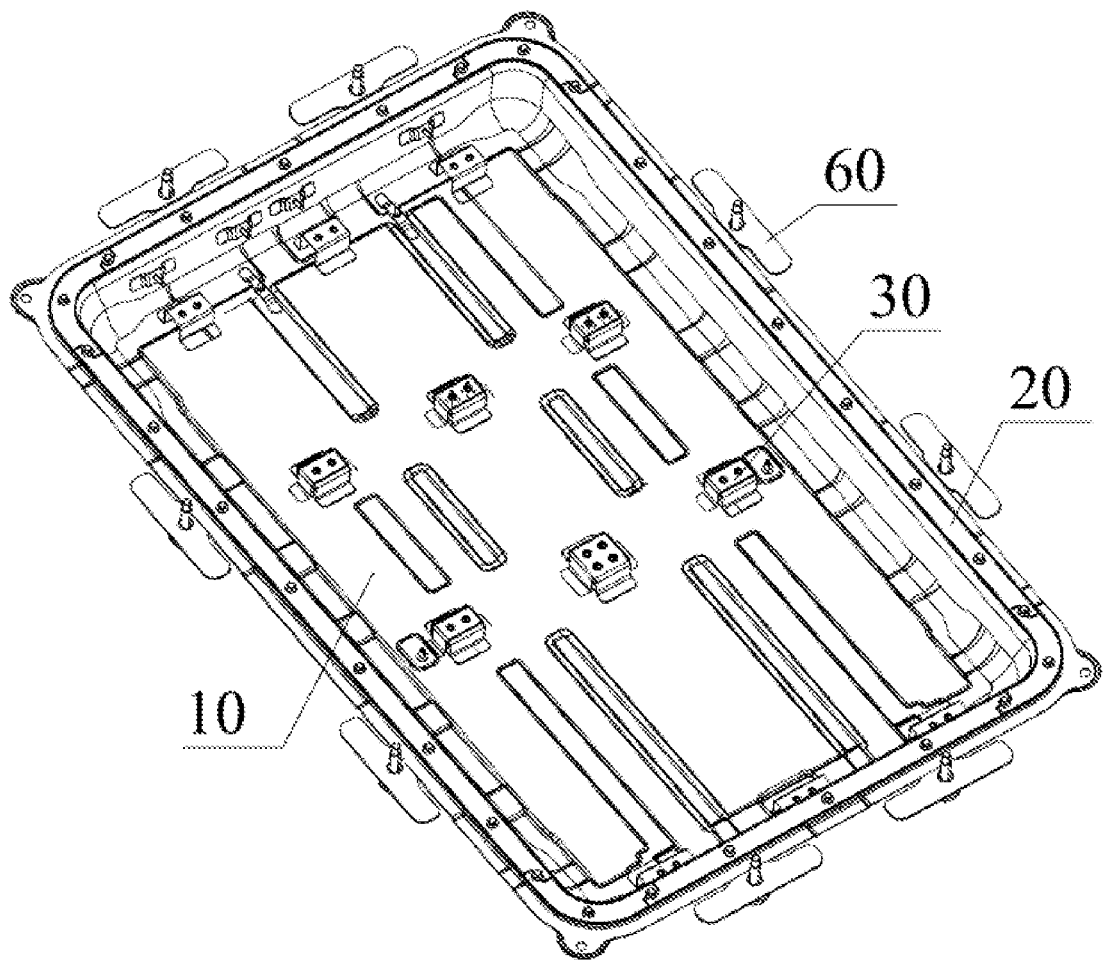
FIG. 1 is a structural schematic diagram of an automobile tray component in the prior art.

Tray base plate: 10; upper plate body: 111; lower plate body: 112; buffer cavity: 113; isolation portion: 114; cooling cavity: 115; intermediate plate body: 116; cooling pipe: 117; mounting beam: 20; hollow portion: 21; sub-hollow portion: 211; cooling sub-hollow portion: 212; reinforcement beam: 23; battery mounting structure: 30; mounting portion: 60.

DETAILED DESCRIPTION

Embodiments of the present disclosure are described below in detail, and examples of the embodiments are shown in the accompanying drawings, where the same or similar reference numerals represent the same or similar elements or elements having the same or similar functions throughout. The embodiments described below with reference to the accompanying drawings are exemplary, and are intended to be illustrative of the present disclosure and cannot be construed as limiting the present disclosure.

In the description of the present disclosure, it is understood that orientation or position relationships indicted by terms such as "length", "width", "thickness", "upper", "lower", "front", "rear", "left", "right", "vertical", "horizontal", "top", "bottom", "interior", and "exterior" are based on orientation or position relationships shown in the accompanying drawings, are merely to facilitate the description of the present disclosure and simplify the description, instead of indicating or implying that the indicated device or element needs to have particular orientations or be constructed and operated in particular orientations, and cannot be construed as limiting the present disclosure. Further, the terms "first" and "second" are merely for the purpose of description, and cannot be construed as indicating or implying relative importance or implicitly specifying the number of technical features indicated. Thus, features defined by "first" and "second" may explicitly or implicitly include one or more of the features. In the description of the present disclosure, "a plurality of" means two or more, unless otherwise explicitly and specifically defined.

In the present disclosure, unless otherwise explicitly specified and defined, terms such as "mounted", "connected", and "fixed" should be understood in broad sense, for example, fixed connection, detachable connection, or integral connection can be used; mechanical connection or electrical connection can be used; and direct connection, indirect connection via an intermediate medium or internal communication of two elements can be used. The specific meanings of the above terms in the present disclosure may be understood according to specific circumstances for a person of ordinary skill in the art.

An automobile tray component according to the embodiments of the present disclosure is described below in combination with FIG. 2 to FIG. 6.

As shown in FIG. 2 to FIG. 5, the present disclosure provides an automobile tray component, including a tray base plate 10 and mounting beams 20 arranged around the tray base plate 10, the tray base plate 10 includes an upper plate body 111, an intermediate plate body 116 and a lower plate body 112, a cooling cavity 115 is arranged between the upper plate body 111 and the intermediate plate body 116, and a buffer cavity 113 is arranged between the intermediate plate body 116 and the lower plate body 112.

Generally, an automobile tray component commonly used in the art is rectangular. A rectangular tray base plate 10 and four mounting beams 20 arranged around the tray base plate 10. The mounting beams 20 may be made to be an integral structure with the tray base plate 10, or may be a split-type structure, that is, four mounting beams 20 are made around the tray base plate 10 by welding or another process.

Figure 3:
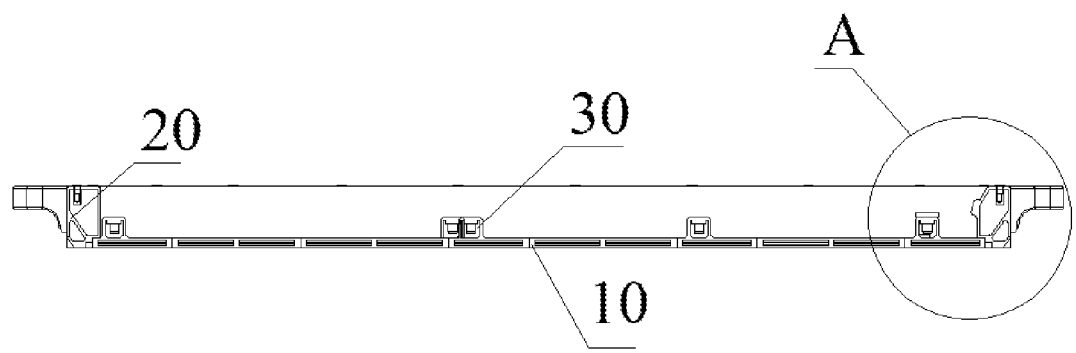
FIG. 3 is a schematic sectional view of an automobile tray component according to an embodiment of the present disclosure in a length direction.
Figure 4:
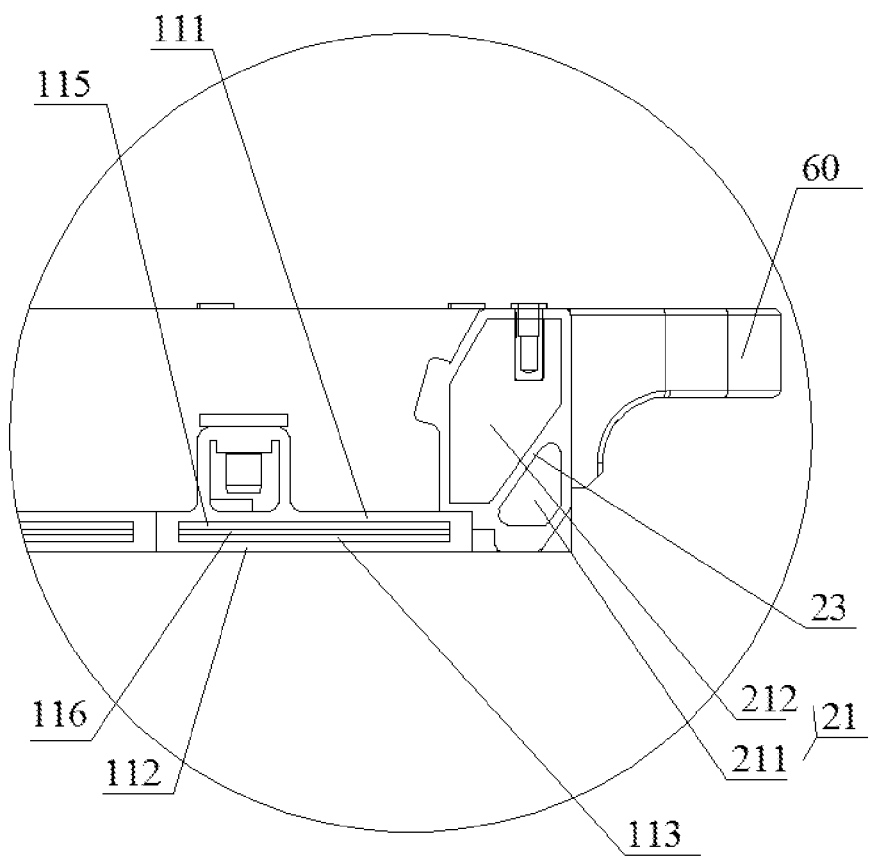
FIG. 4 is an enlarged schematic view of a section A in FIG. 3.

The mounting beam 20 is generally an integral structure, the direction of a longer side of a rectangle is generally considered as a length direction of the tray base plate 10 or the automobile tray component, while the direction of a shorter side of the rectangle is generally considered as a width direction of the tray base plate 10 or the automobile tray component. As shown in FIG. 3 or FIG. 4, the left-right direction is the length direction, while the up-down direction is a thickness direction, and the thickness direction is a thickness direction of the tray base plate 10 or the automobile tray component. Describing in combination with an automobile, generally, the length direction of the tray base plate 10 is consistent with a travelling direction of the automobile, and the width direction of the tray base plate 10 corresponds to a width direction of an automobile body.

In the present disclosure, the tray base plate 10 includes at least one sub-base plate, the sub-base plate includes an upper sub-plate body, an intermediate sub-plate body, and a lower sub-plate body, a cooling cavity is arranged between the upper sub-plate body and the intermediate sub-plate body, and a buffer cavity is arranged between the intermediate sub-plate body and the lower sub-plate body. The foregoing is merely one preferred implementation of the present disclosure, the purpose of which is to facilitate manufacturing the tray base plate 10. Generally, the automobile tray base plate 10 has a relatively large area. During mechanical processing, on the integrally molded tray base plate 10 with a large area, it is difficult to directly form, by processing, the cooling cavity 115, the buffer cavity 113, and the intermediate plate body 116 between the two cavities. Therefore, in order to facilitate processing and also to integrally mold the upper plate body 111, the lower plate body 112, the buffer cavity 113, the cooling cavity 115, and the intermediate plate body 116 by processing, the tray base plate 10 is divided into a plurality of pieces for manufacturing. That is, the tray base plate 10 is assembled by using at least one sub-base plate. With regard to the number of sub-plate bodies, it can be determined according to the area required by the tray base plate 10 or other factors.

On this basis, the sub-base plate includes an upper sub-plate body, an intermediate sub-plate body, and a lower sub-plate body. A cooling cavity is arranged between the upper sub-plate body and the intermediate sub-plate body, and a buffer cavity is arranged between the intermediate sub-plate body and the lower sub-plate body. In combination with the overall structure of the tray base plate 10, the above molding method can be readily understood by a person skilled in the art.

As shown in FIG. 4, the upper plate body 111, the lower plate body 112, and the intermediate plate body 116 are all preferably plate bodies perpendicular to the thickness direction. Generally, the upper plate body 111, the lower plate body 112 and the intermediate plate body 116 are plate bodies parallel to each other, and the plane where the upper plate body 111, the lower plate body 112 and the intermediate plate body 116 are located is consistent with the plane where the tray base plate 10 is located.

As shown in FIG. 4, the cooling cavity 115 and the buffer cavity 113 are generally flat cavities parallel to the upper plate body 111, the lower plate body 112, or the intermediate plate body 116. In some embodiments of the present disclosure, the upper plate body 111, the lower plate body 112, the intermediate plate body 116, the cooling cavity 115, and the buffer cavity 113 are integrally molded by using a piece of metal plate (such as an aluminium product). More specifically, the intermediate plate body 116, the cooling cavity 115 and the buffer cavity 113 may be formed by stamping a solid aluminium plate.

In the present disclosure, due to presence of the buffer cavity 113, when the automobile tray component is under impact, the buffer cavity 113 can provide certain buffer space. The lower plate body 112 has certain buffer space when it is recessed upwards by the impact, and thus can protect the power batteries arranged in the tray component and prevent the impact from influencing the safety performance of the power battery. Meanwhile, the cooling cavity 115 located above the buffer cavity 113 may provide a good effect of heat dissipation for the power batteries mounted there above, so as to improve the safety of the batteries. Additionally, with the buffer cavity 113 arranged in a lower layer, deformation of the lower plate body 112 would not influence the cooling cavity 115 above when the lower plate body is under impact, so that the cooling cavity 115 would not be deformed under force and have a poor effect of heat dissipation, thus further improving the effect of heat dissipation and the safety of the power batteries.

Figure 6:
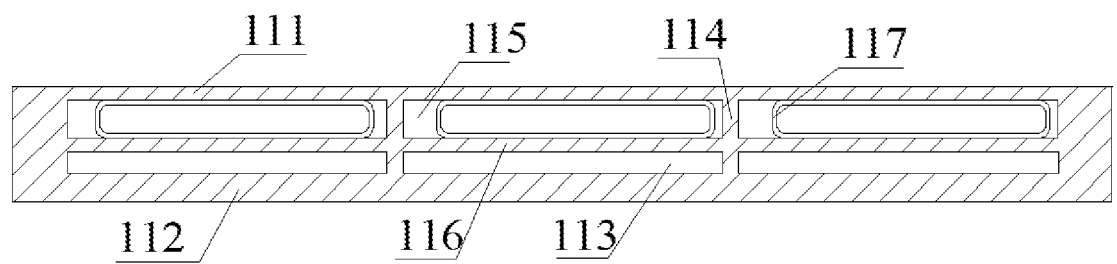
FIG. 6 is a schematic sectional view of a tray base plate according to an embodiment of the present disclosure.

In some embodiments of the present disclosure, as shown in FIG. 6, a cooling pipe 117 may be arranged in the interior of the cooling cavity 115. One face of the cooling pipe 117 is attached onto the upper plate body 111, and can perform heat conduction well with the power batteries arranged on the upper plate body 111. Meanwhile, a cooling medium is arranged in the interior of a cooling channel, and the cooling medium may be gas or liquid and can transfer and dissipated the heat from the upper plate body 111.

The above cooling pipe 117 may have a curved shape laid integrally in the cooling cavity 115, and the cooling medium is led in from one end of the cooling pipe 117 and exported from the other end, forming a cooling circulation pipe. The cooling pipe 117 may alternatively be made to be a straight pipe directly, the straight pipe is disposed in the width direction of an automobile tray preferably, and therefore, both ends of the cooling pipe 117 may be led out along edges of the mounting beams 20. Furthermore, a hollow portion 21 may be arranged in the interior of the mounting beams 20, a lead-in port and a lead-out port may be provided, and the cooling pipe 117 arranged in the cooling cavity 115 may enter the hollow portion 21 from the lead-in port and be led out to the exterior via the lead-out port of the hollow portion 21.

Additionally, in some preferred embodiments of the present disclosure, an integrally molded cooling channel may be directly formed on the tray base plate 10. More specifically, the cooling cavity 115 is divided into a plurality of sub-cooling cavities through an isolation portion 114, the plurality of sub-cooling cavities themselves are used as storage spaces of cooling media, and then the plurality of sub-cooling cavities are connected in series or in parallel, so that a complete cooling channel is formed.

As aforementioned, the above sub-base plate may be a one-piece extruded aluminium base plate. The base plate made of an aluminium material may easily form a structure which is hollow in the interior due to properties of the material itself, that is, the tray base plate 10 including the buffer cavity 113 and the cooling cavity 115 in the interior provided in the present disclosure.

A vacuum cavity is arranged in the buffer cavity 113 and can isolate internal temperature of the power battery from the ambient temperature, so as to reduce the influence of an extreme environment on the power battery arranged in the automobile tray component.

The above buffer cavities 113 may all be vacuum cavities, or some of the buffer cavities 113 therein may also be vacuum cavities. Of course, in order to effectively isolate the temperature in the interior of the automobile tray component from the ambient temperature in the exterior, manufacturing all buffer cavities 113 to be vacuum cavities is the most preferred.

In addition to this, energy absorption material such as phase change material may also be filled in the buffer cavity 113, so as to form a an energy absorption material-filled cavity, which in fact is a component formed by filling the energy absorption material in the buffer cavity 113. Similarly, thermal insulation material is filled in the buffer cavity 113 to form a thermal insulation material-filled cavity.

Whether the buffer cavity 113 is made into a vacuum cavity, an energy absorption material-filled cavity, or a thermal insulation material-filled cavity, their functions are the same: on one hand, it is used for buffering to reduce damage; on the other hand, the cooling cavity 115 located above the buffer cavity 113 can be well isolated from the external environment so as to reduce the influence of the external environment on the power batteries in the automobile tray component in the extreme environment.

In the present disclosure, the buffer cavity 113 is divided into at least two sub-buffer cavities through the isolation portion 114, and at least one sub-buffer cavity of which is a vacuum cavity. Of course, based on the above description, all sub-buffer cavities may be made to be vacuum cavities so as to facilitate better temperature insulation. Generally, the tray base plate 10 may include a plurality of sub-base plates, each sub-base plate includes a buffer cavity 113 thereon, and meanwhile the buffer cavity 113 on each sub-base plate may also be divided into at least two sub-buffer cavities. Regardless of which circumstance above, all buffer cavities may be made to be vacuum cavities.

In different automobile travelling environments, for example, in a cold region, low temperature may influence charging and discharging performance of the power battery; and when the power battery is used in a cold environment, generally, the power battery needs to be heated appropriately so as to improve its overall performance. At this point, the temperature is low in the environment, and it is disadvantageous to use of the battery if there is no thermal insulation between the power battery and the environment. Therefore, in the present disclosure, the buffer cavity 113 is arranged on the tray base plate 10, so that on one hand, a buffer effect is provided against impact so as to guarantee the safety performance of the power battery under impact. On the other hand, some or all of the above buffer cavities 113 may be selected to be vacuum cavities so as to isolate the interior of the automobile tray component from the external environment, reduce the adverse influence of external low temperature environment on the power battery and improve the service performance of the power battery.

Similarly, in the present disclosure, the cooling cavity 115 locate above the buffer cavity 113 may also be divided into a plurality of sub-cooling cavities through the isolation portion 114, so that on one hand, the plurality of sub-cooling cavities may be disposed to constitute a cooling channel directly. On the other hand, the cooling pipes 117 arranged in the cooling cavity 115 may be isolated so as to reduce the mutual influence between the cooling pipes 117 and, additionally, to further facilitate mounting the cooling pipes 117.

In some embodiments of the present disclosure, considering the size of the tray base plate 10, if the tray base plate 10 is relatively large, the tray base plate 10 is constituted by combining at least two sub-base plates. Therefore, a whole piece of tray base plate 10 may be formed by at least two sub-base plates that are arranged side by side and connected to each other. Generally, the tray base plate 10 is formed by at least two sub-base plates that are disposed in the length direction of the tray base plate 10 and combined. Therefore, a relatively large tray base plate 10 may be divided into a plurality of small sub-base plates so as to facilitate manufacturing buffer cavities 113 and cooling cavities 115 on the sub-base plates.

Preferably, two adjacent sub-base plates are connected by welding. The robustness of the welding and the aesthetics of the formed tray base plate 10 are taken into consideration. In some embodiments of the present disclosure, the cooling cavities 115 and/or the buffer cavities 113 extend in the width direction of the automobile tray component. That is, the buffer cavities 113 and/or the cooling cavities 115 are arranged in the width direction of the tray base plate 10 so as to further facilitate, on one hand, disposition of the buffer cavities 113 and the cooling cavities 115 and further facilitate, on the other hand, filling of flow channels and other material as well.

Figure 5:
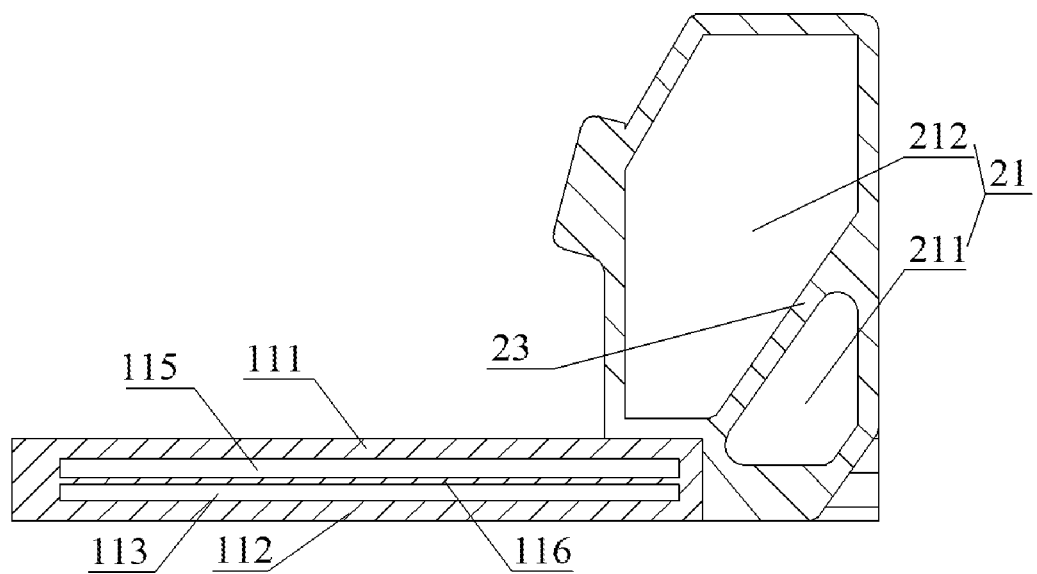
FIG. 5 is a combined schematic sectional view of a tray base plate and mounting beams according to an embodiment of the present disclosure.

In some embodiments of the present disclosure, as shown in FIG. 5, a hollow portion 21 is arranged in the interior of the mounting beam 20, and the hollow portion 21 extends in a length direction of the mounting beam 20. The hollow portion 21 is used for wiring of the power battery or leading out of the cooling pipe 117. If the mounting beam 20 is mounted in the length direction of the tray component, the length direction of the mounting beam 20 is the length direction of the tray component; and if the mounting beam 20 is mounted in the width direction of the tray component, a width direction of the mounting beam 20 is the width direction of the tray component.

In some other embodiments of the present disclosure, a lead-out port (not shown) is arranged on the mounting beam 20, lead-out wires of the power battery arranged on the automobile tray component and/or the cooling pipes 117 arranged on the automobile tray component are laid inside the hollow portion 21 and led out to the exterior of the automobile tray component through the lead-out port. By leading the lead-out wires or the cooling pipes 117 out through the hollow portion 21 on the mounting beam 20, the lead-out wires or the cooling pipes 117 may be led out more regularly while saving space occupation in the interior of the automobile tray component, thus avoiding the disordered disposition of internal lead-out wires in a traditional automobile tray component, and reducing a risk of short circuit caused by the disordered disposition.

In the present disclosure, a reinforcement beam 23 extending in the length direction of the mounting beam 20 is arranged in the interior of the mounting beam 20, and the reinforcement beam 23 divides the hollow portion 21 into at least two sub-hollow portions 211. The hollow portion 21 is divided into at least two portions, that is, two sub-hollow portions 211, through one or more reinforcement beams 23. In this way, on one hand, the strength of the mounting beam 20 may be increased through the reinforcement beam 23; and on the other hand, the lead-out wires and the cooling pipes 117 may also be led out better in an ordered manner, or the lead-out wires and the cooling pipes 117 may even be led out through two different sub-hollow portions 211 respectively.

In some embodiments, one of the at least two sub-hollow portions 211 above is used to lay the lead-out wires mounted on the automobile tray component. That is, one sub-hollow portion 211 therein is used to mount the lead-out wires.

In some other embodiments, at least one sub-hollow portion 211 is used to lay the cooling pipes 117 mounted on the automobile tray component. In the present disclosure, the lead-out wires or the cooling pipes 117 may be led out through one of the sub-hollow portions 211 in the alternative only, may also be lead out through one sub-hollow portion 211 simultaneously, or may also be arranged in different sub-hollow portions 211 respectively.

Furthermore, in some embodiments of the present disclosure, one of the sub-hollow portions 211 may be used as a cooling channel, which is referred to as a cooling sub-hollow portion 212. That is, the sub-hollow portion 211 itself is used as a cooling channel, where a cooling medium is imported directly, without providing a cooling pipe 117 therein any more. When one of the sub-hollow portions 211 is used as the cooling sub-hollow portion 212, generally, the cross sectional area of the cooling sub-hollow portion 212 may be made relatively small and smaller than the cross-sectional areas of other sub-hollow portions 211, that is, the area of a cross section taken along a plane perpendicular to the width direction of the tray base plate 10. Therefore, the space in the interior of the mounting beam 20 may be utilized more reasonably, a larger cross section may be reserved in positions where wiring and large space are needed, and a small cross section may be reserved in the flow channel of the cooling media.

In one preferred embodiment of the present disclosure, the mounting beam 20 may be a one-piece extruded aluminium beam. As described above, in the design, the plasticity of the beam of aluminium material and the selection of manufacturing processes are taken into consideration.

In some embodiments of the present disclosure, more specifically, in order to facilitate designing and mounting the mounting beam 20, the mounting beam 20 is preferred to be square. In some other embodiments, the square mounting beam 20 is arranged perpendicular to the tray base plate 10 so as to further facilitate fixed connection between the mounting beam 20 and the tray base plate 10.

More specifically, in some embodiments, the hollow portion 21 in the mounting beam 20 is a square hollow portion 21, and the square hollow portion 21 extends through the length direction of the whole mounting beam 20.

In some embodiments of the present disclosure, as shown in FIG. 5, the reinforcement beam 23 in the interior of the mounting beam 20 is an inclined plate arranged along an angle of the square hollow portion 21, the reinforcement beam 23 divides the square hollow portion 21 into two portions, one is a sub-hollow portion 211 of a triangular cross section, and the other is a sub-hollow portion 211 of a trapezoidal cross section. The reinforcement beam 23 designed as such may improve the overall strength of the mounting beam 20. Of course, the foregoing are merely some preferred methods of the present disclosure. A person skilled in the art may also adjust positions of the reinforcement beams 23 and shapes of the two sub-hollow portions 211 according to specific design requirements.

In some other embodiments of the present disclosure, a plurality of reinforcement beams 23 may be arranged in the interior of the mounting beam 20 and divide the hollow portion 21 into a plurality of sub-hollow portions 211, wherein some sub-hollow portions 211 are filled with functional material; some sub-hollow portions 211 are filled with cooling media and used as cooling sub-hollow portions 212; and some other sub-hollow portions 211 are used for leading wires.

In some embodiments of the present disclosure, as shown in FIG. 6, at least one vertical isolation portion 114 perpendicular to the intermediate plate body 116 or the lower plate body 112 is arranged between the intermediate plate body 116 and the lower plate body 112, and the buffer cavity 113 is divided into at least two sub-buffer cavities by the isolation portion 114 described above.

As described above, generally, the buffer cavity 113 is a cavity (generally, a rectangular cavity) parallel to the tray base plate 10, while the isolation portion 114 is in a vertical direction, that is, in a direction perpendicular to the plane where the tray base plate 10 is located, and extends in the width direction of the tray base plate 10. At this point, the vertical isolation portion 114 divides the buffer cavity 113 into at least two sub-buffer cavities. The sub-buffer cavities are also parallel to the direction of the tray base plate 10 and located on both sides of the isolation portion 114 respectively.

With the arrangement of the isolation portion 114, on one hand, the overall mechanical strength of the tray base plate 10 can be improved, and on the other hand, the buffer cavity 113 is divided into at least two portions as well so as to facilitate arrangement of another part, and phase change material may be arranged in some sub-buffer cavities so as to improve the overall performance of heat dissipation and thermal insulation of the tray base plate 10. In another embodiment of the present disclosure, as shown in FIG. 6, at least one vertical isolation portion 114 perpendicular to the intermediate plate body 116 or the upper plate body 111 is arranged between the upper plate body 111 and the intermediate plate body 116, and the cooling cavity 115 is divided into at least two sub-cooling cavities by the isolation portion 114 described above.

As described above, generally, the cooling cavity 115 is a cavity (generally, a rectangular cavity) parallel to the tray base plate 10, while the isolation portion 114 is in a vertical direction, that is, in a direction perpendicular to the plane where the tray base plate 10 is located, and extends in the width direction of the tray base plate 10. At this point, the vertical isolation portion 114 divides the cooling cavity 115 into at least two sub-cooling cavities. The sub-cooling cavities are also parallel to the direction of the tray base plate 10 and located on both sides of the isolation portion 114 respectively.

For example, the cooling pipes 117 may be arranged in some sub-cooling cavities, or some of the sub-cooling cavities themselves may be directly used as cooling channels.

As shown in FIG. 6, an isolation portion 114 may extend through the cooling cavity 115 and the buffer cavity 113 in the up-down direction, that is, the buffer cavity 113 and the cooling cavity 115 share one isolation portion 114.

More specifically, the buffer cavity 113 and the cooling cavity 115 extend in the width direction (that is, the width direction of the tray base plate 10) of the automobile tray component, the buffer cavity 113 is divided into at least two sub-buffer cavities by the isolation portion 114 extending in the width direction of the automobile tray component and the cooling cavity 115 is divided into at least two sub-cooling cavities by the isolation portion 114 extending in the width direction of the automobile tray component. The above structure is one preferred implementation of the present disclosure and further defines the direction in which the sub-buffer cavities and the sub-cooling cavities extend through. During general manufacturing, the tray base plate 10 is often constituted by combining a plurality of sub-base plates, each sub-base plate is disposed in the length direction of the tray base plate 10, and both the buffer cavity 113 and the cooling cavity 115 in each sub-plate extend in the width direction of the tray base plate 10, so that processing is more convenient, a relatively large tray base plate 10 may be divided into a plurality of sub-base plates for manufacturing because small sub-base plates are easier to be processed and manufactured, and thus buffer cavities 113 and cooling cavities 115 in the interior thereof are easier to be molded.

In some embodiments of the present disclosure, some or all of the cooling cavities 115 on adjacent sub-base plates may be interconnected. Generally, when cooling pipes 117 are arranged in the cooling cavities 115 on the sub-base plates, the cooling cavities 115 on the adjacent sub-base plates may be selected to be interconnected as shown in FIG. 6. Therefore, the cooling pipes 117 in the cooling cavities 115 arranged on different sub-base plates may be enabled to be in connected and form an integrated whole cooling pipe 117. More specifically, when the sub-base plate includes at least two sub-cooling cavities, at least one sub-cooling cavity between adjacent sub-base plates is connected so as to facilitate arrangement and form an integral connection of the cooling pipes 117. In particular, when some of the sub-cooling cavities are directly used as cooling channels, adjacent cooling cavities may be interconnected and form an integral cooling channel. More specifically, the isolation portion 114 between two adjacent sub-cooling cavities may be made shorter, so that end portions of the cooling channel may be opened so as to enable the two adjacent sub-cooling cavities to be interconnected and form a complete cooling channel; and in the solution that cooling pipes 117 are arranged in sub-cooling cavities, the isolation portion 114 may also be arranged as such.

In the above description, any implementation can be employed as long as a cooling circulation channel may be formed by enabling the cooling channels in the tray base plate 10 to be connected or a cooling circulation channel may be formed by enabling the sub-cooling cavities in the tray base plate 10 to be connected. The foregoing are several preferred implementations of the present disclosure, and such designs save more internal spaces, also further facilitate ordered internal structural design and do not constitute limitation on the present disclosure.

Figure 2:
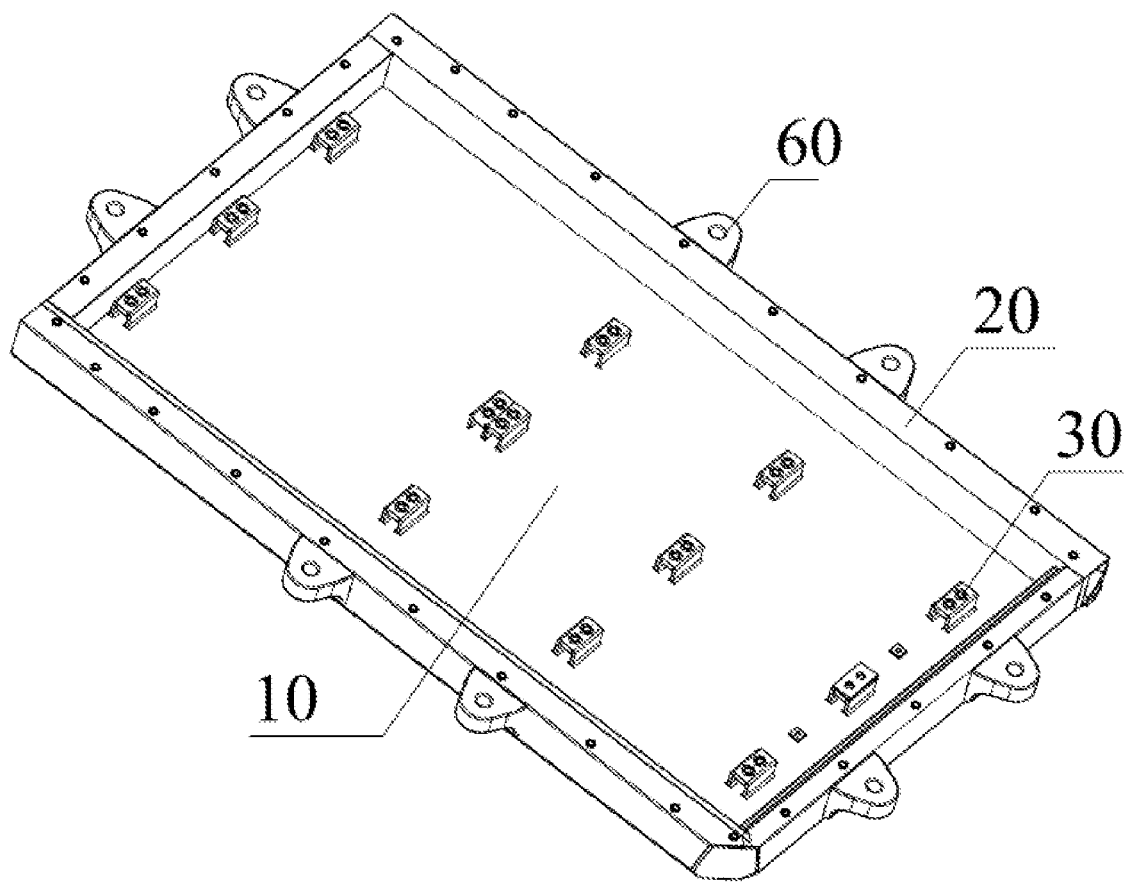
FIG. 2 is a structural schematic diagram of an automobile tray component according to an embodiment of the present disclosure.

In some embodiments of the present disclosure, a battery mounting structure 30 for mounting a power battery is arranged on the tray base plate 10. Generally, the mounting structure is one with internally threaded holes, and the power battery (preferably, a module set or a module) is fixed and mounted on the mounting structure. As shown in FIG. 2, in some embodiments, the tray base plate 10 is provided with several mounting structures, wherein 4 mounting structures form a mounting combination, and the power battery (a module set or a module) is mounted on the mounting combination. More specifically, 4 mounting structures may be arranged on one sub-base plate, and the power batteries are mounted on the four mounting structures; that is, one sub-base plate corresponds to one power battery module set or power battery module, so the area of the sub-base plate is required to be the same as or similar to the lower surface area of the power battery module set. Therefore, the sub-base plates may correspond to the power battery module sets on a one-to-one basis, so as to facilitate structural design and combined mounting.

Generally, mounting is performed on the tray base plate 10 in the form of battery module sets. That is, several single batteries constitute a battery module set, and then, the battery module set is mounted on the tray base plate 10. Other than this, if there is a special need, more mounting mechanisms may also be arranged on the tray base plate 10 so that two mounting structures correspond to one single battery. Considering the ease of mounting, applicability of structure and applicability of space usage, the form of assembling the battery module set is selected generally.

In order to facilitate combination of the tray base plate 10, considering the matching of length and width as well as the feasibility of manufacturing sub-base plates comprehensively, a plurality of sub-base plates are disposed in the length direction of the automobile tray component, while the buffer cavity 113 and the cooling cavity 115 extend along the width direction of the automobile tray component. Compared with the feature that a plurality of sub-base plates are disposed in the length direction of the automobile tray component while the buffer cavity 113 and the cooling cavity 115 extend in the width direction of the automobile tray component, by the above method, the length of a longer side of each sub-base plate may be reduced, thus facilitating integral molding of the sub-base plates and also facilitating design of the buffer cavity 113.

The present disclosure further provide an automobile battery package, further including an encapsulation cover, and the encapsulation cover, the tray base plate 10, and the mounting beam 20 together form a mounting space for mounting the power batteries. More specifically, the mounting beam 20 is fixed around the tray base plate 10 by welding or another mechanical connection, and welding is preferred. Moreover, an integrated automobile tray component is formed finally by the encapsulation cover being fixedly connected with the mounting beam 20 from all directions.

Meanwhile, as a common automobile tray component in the art, generally, a mounting portion 60 is arranged on the mounting beam 20, and the automobile tray component is mounted and fixed on the automobile through the mounting portion 60.

Generally, several fixing holes are arranged on the mounting beam 20, and the encapsulation cover and the mounting beam 20 are encapsulated together through a bolt.

The present disclosure further provides an automobile, including an automobile tray component and power batteries arranged on the automobile tray component, and the automobile tray component is the automobile tray component provided in the present disclosure. More specifically, the above power batteries are mounted on the automobile tray component, and meanwhile the automobile tray component is fixedly mounted on the automobile.

In the description of the present description, the description of reference terms such as "one embodiment", "some embodiments", "example", "specific example", or "some examples" means that specific features, structures, materials or characteristics described in combination with the embodiment or example are included in at least one embodiment or example of the present disclosure. In the present description, the schematic expression of the above terms does not necessarily refer to the same embodiment or example. Moreover, the described specific features, structures, materials or characteristics may be combined in any suitable manner in any one or more embodiments or examples.

Although the embodiments of the present disclosure have been shown and described above, it should be understood that the above embodiments are exemplary and should not be construed as limiting the present disclosure, and a person skilled in the art may make changes, modifications, replacements and variations to the above embodiments within the scope of the present disclosure without departing from the principles and objectives of the present disclosure.

What is claimed is:

1. An automobile tray component, comprising:
   at least one tray base plate, comprising an upper plate body, an intermediate plate body, and a lower plate body; and
   a plurality of mounting beams arranged around the at least one tray base plate, wherein a cooling cavity is arranged between the upper plate body and the intermediate plate body; a cooling pipe is arranged in the cooling cavity; and a buffer cavity is arranged between the intermediate plate body and the lower plate body.

2. The automobile tray component according to claim 1, wherein the at least one tray base plate comprises two or more tray base plates.

3. The automobile tray component according to claim 1, wherein the at least one tray base plate is a one-piece extruded aluminium base plate.

4. The automobile tray component according to claim 2, wherein the two or more tray base plates are connected by welding.

5. The automobile tray component according to claim 1, wherein the cooling cavity or the buffer cavity extends in a width direction of the automobile tray component.

6. The automobile tray component according to claim 1, wherein a battery mounting structure for mounting a power battery is arranged on the at least one tray base plate.

7. The automobile tray component according to claim 1, wherein the buffer cavity is a vacuum cavity, or the buffer cavity is filled with an energy absorption material, or the buffer cavity is filled with a thermal insulation material.

8. An automobile battery package, comprising:
the automobile tray component according to claim 1;
an encapsulation cover; and
a plurality of power batteries arranged in a mounting space formed by the encapsulation cover and the automobile tray component.

9. An automobile, comprising the automobile tray component according to claim 1 and a plurality of power batteries arranged on the automobile tray component.

* * * * *